United States Patent

Haquet et al.

[11] Patent Number: 5,906,229
[45] Date of Patent: May 25, 1999

[54] METHOD AND DEVICE FOR THE UNIFORM FILLING OF PARTICLES OF A SOLID CATALYST INTO A TUBULAR REACTOR

[75] Inventors: Yvon Haquet, Saint Romain de Colbosc; Jean-Pierre Tref, Le Havre, both of France

[73] Assignee: Total Raffinage Distribution S.A., Puteaux, France

[21] Appl. No.: 08/848,544

[22] Filed: Apr. 28, 1997

[30] Foreign Application Priority Data

Apr. 26, 1996 [FR] France ................................... 96 05306

[51] Int. Cl.⁶ ........................................................ B65B 1/04
[52] U.S. Cl. .......................... 141/286; 141/237; 414/299; 414/300
[58] Field of Search ................................... 141/1, 11, 234, 141/235, 237, 242, 244, 247, 286, 391, 392; 414/299, 300, 301

[56] References Cited

U.S. PATENT DOCUMENTS

| 3,608,751 | 9/1971 | Hundtofte | 214/17 C |
|---|---|---|---|
| 3,788,370 | 1/1974 | Hare et al. | 141/125 |
| 3,913,806 | 10/1975 | Red, Jr. | 222/429 |
| 4,306,829 | 12/1981 | Loutaty et al. | 414/301 |
| 4,461,327 | 7/1984 | Magin et al. | 141/1 |
| 4,564,328 | 1/1986 | Loutaty et al. | 414/300 |
| 5,247,970 | 9/1993 | Ryntvelt et al. | 141/250 |

FOREIGN PATENT DOCUMENTS

| A-656 228 | 6/1995 | European Pat. Off. | B01J 37/02 |
|---|---|---|---|
| A 2 691 954 | 12/1993 | France | B01J 35/02 |
| A 59/139 923 | 8/1984 | Japan | B01J 4/00 |
| A 1 267 086 | 3/1972 | United Kingdom | B65G 51/36 |
| A 2 287 016 | 9/1995 | United Kingdom | B01J 8/00 |

Primary Examiner—Steven O. Douglas
Attorney, Agent, or Firm—Frommer Lawrence & Haug LLP; A. Thomas S. Safford

[57] ABSTRACT

Method and apparatus for the uniform dense pack filling of particles of a solid catalyst (6) in a tubular reactor, of the type comprising a plurality of vertical tubes (2) opening at their upper end at the surface of a tube plate, which connects them together and is substantially parallel to them, and having above the tube plate, a system for the uniform distribution in a falling rain of the particles of catalyst, the improvement including:

an initial cylindrical wall adapted to rest around and above the tube plate, and cylindrical walls of successively smaller diameters (formed from the initial wall or separately) being also adapted to rest in succession on the tube plate in order to separate the tubes then currently completely filled with catalyst from the tubes not completely filled.

20 Claims, 3 Drawing Sheets

METHOD AND DEVICE FOR THE UNIFORM FILLING OF PARTICLES OF A SOLID CATALYST INTO A TUBULAR REACTOR

RELATED APPLICATION

This application claims priority to French Application No. 96 05306, filed Apr. 26, 1996, incorporated herein by reference.

BACKGROUND OF THE INVENTION

1. Field of the Invention

The present invention relates to a method and a device for filling particles of a solid catalyst uniformly into a tubular reactor. The invention also relates to a device for carrying out the method.

2. Description of the Related Art

It is known that tubular chemical reactors comprise typically several hundred to several thousand vertically arranged tubes.

The filling of these tubes with particles of solid catalyst is of great importance since the conditions and results of the reaction, which will be carried out in the reactor in the presence of the catalyst (for instance, the manufacture of ethylene oxide, aniline, etc.), depend significantly on the uniformity and homogeneity of the filling of the different tubes.

During the filling, empty spaces may be formed between the grains of catalyst within the tubes, thus creating, during the exothermal reaction, hot points on said tubes, which are prejudicial to the metallurgy of said tubes. Furthermore, the charge of the reactor can pass by way of preference through poorly filled tubes, resulting in poor operation of the reactor and therefore a poor yield of the industrial unit.

Summarizing, it can be said that a poor filling of the tubes results in a reduction in the useful life of the reactor and in more frequent intervention for maintenance, resulting in interruptions in the production cycle.

In order to obtain a uniform filling of the tubes, it has therefore been proposed that the filling of the catalyst be effected tube by tube (see EP-A 041 144 [or equivalent U.S. Pat. No. 4,461,327]), possibly arranging accessories in the tubes in order to facilitate the distribution of the particles of catalyst within them (see, for instance, EP-A 548 999 [or equivalent U.S. Pat. Nos. 5,247,970] or 3,608,751).

It has also been proposed to effect the filling of the reactor by series of tubes (for instance of 10 to 20 tubes), as described in U.S. Pat. No. 3,913,806 or JP-A 59/139 923.

Finally, in order to accelerate the filling of the catalyst particles, it has also been proposed to vibrate the feed receptacles, as described in FR-A 2 691 954 or GB-A 1 267 086 [or equivalent U.S. Pat. No. 3,700,140].

However, these methods have the drawback of requiring extremely long filling times, of using complicated and bulky filling machines, of requiring the presence of several operators and of leading, despite everything, to appreciable differences in density of filling between the tubes of one and the same reactor.

The present invention is directed at overcoming these drawbacks of the prior art by recourse to known homogeneous filling methods and devices of the "dense filling" type, which are already used in catalyst-bed chemical reactors. These techniques are described, for instance, in EP-A 007 854 [or equivalent U.S. Pat. No. 4,306,829], EP-A 116 246 [or equivalent U.S. Pat. No. 4,564,328], and French Patent Application No. 95 12334 of Oct. 21, 1995 [or equivalent U.S. patent application Ser. No. 08/735,373].

It is known that these so-called dense filling techniques employ a substantially uniform distribution of the catalyst particles by a rain effect, these particles being poured into the upper part of the reactor onto a generally mobile unit driven in rotation (comprising, for instance, circular sectors or flexible thongs), thus permitting a substantially uniform distribution within the reactor.

In the course of different jobs, which consisted in applying these techniques for the uniform distribution of a solid in divided form to the filling of tubular reactors, it was found that the tubes located furthest to the outside of the tube plate are filled faster than those located in the central part of the reactor. The tube plate of the reactor should be understood to be the metal plate which connects the different tubes together at their upper part and which is arranged substantially perpendicular to said tubes. It follows that, if this filling is continued, the accumulation of the particles is accentuated at the site of the filled tubes located furthest to the outside of the tube plate. This accumulation of particles causes, by overflow, a non-dense filling of the tubes in the course of filling, which are located nearer the center of said tube plate.

Furthermore, it is known that if the particles of catalyst are fragile, one frequently encounters risks of attrition of these particles when they fall on the tube plate of the reactor.

OBJECTS AND SUMMARY OF THE INVENTION

Therefore, the present invention is directed at adapting the uniform filling techniques of the chemical reactors of the prior art to tubular reactors, while eliminating the drawbacks, which have just been mentioned.

For accomplishing this purpose, one preferred embodiment of the invention is a method for the homogeneous filling of particles of a solid catalyst in a tubular reactor, of the type comprising a plurality of vertical tubes debouching at their upper end at the surface of a tube plate, which connects them and is substantially perpendicular to them, by means of a filling system, which assures a uniform rain of the particles on the entire surface of said plate, this method being characterized in that:

a first cylindrical wall of a diameter substantially identical to the tube plate is disposed around and above the tube plate in such a manner that all the filling orifices of the tubes are located within the cylindrical enclosure thus created, particles are uniformly fed within the cylindrical wall, said uniform filling is interrupted when the tubes arranged at the periphery of the tube plate and near the cylindrical wall are full, a second cylindrical wall of a diameter less than the preceding one is disposed on the tube plate, the diameter of this second wall being such that the tubes, which are already full, are located to the outside of said wall, while the tubes, which are not completely filled, are located within said second wall, the uniform distribution of the particles is resumed until the tubes located closest to the cylindrical wall are in their turn full and the filling cycle is continued, each time replacing the cylindrical wall used by a cylindrical wall of smaller diameter separating the filling orifices of the full tubes from those, which are not full.

For carrying out of this method, one may employ, in succession, cylindrical walls of increasingly smaller diameter or, preferably, one and the same cylindrical wall of adjustable diameter so that this diameter can be reduced after each phase of the filling.

During their work, the applicants have found that the rate with which the catalyst is poured into the reactor should be relatively low, preferably between 0.5 tons/hour and 4 tons/hour per m² of cross section of the tube fed.

In order to obtain a uniform distribution of the particles of catalyst in each of the tubes of the reactor, the catalyst is preferably distributed with a rain effect, via a mobile unit located in the upper part of the reactor, driven in rotation around a vertical axis by a drive means, this method and this device being known commercially as "DENSICAT" and being described in the applicants' assignee's French Patent Application No. 95 12334 of Oct. 20, 1995, and in European Patent Applications EP-A 007 854 and EP-A 116 246.

The invention also has, as a further preferred embodiment of the invention, a device for uniform filling of particles of a solid catalyst into a tubular reactor, of the type comprising a plurality of vertical tubes debouching at their upper end on the surface of a tube plate, which connects them and is substantially perpendicular to them, this device comprising, above the tube plate, a system for the uniform distribution of the catalyst particles and being characterized in that it comprises:

- a cylindrical wall adapted to rest around and above the tube plate,
- cylindrical walls of smaller diameters adapted to rest in succession on the tube plate in order to separate the tubes there, which are completely filled, with catalyst from the tubes, which are not completely filled.

Another embodiment of the invention is a variant of such a device, in which the cylindrical walls of different diameters are replaced preferably by a single cylindrical wall of adjustable variable diameter.

The cylindrical wall or walls of these devices can, of course, have any desired height, for instance between 20 and 150 cm and preferably close to 150 cm.

One can also use a cylindrical wall of adjustable diameter comprising preferably cylindrical sectors, which overlap laterally and are held on the outside by at least one adjustable outer strap.

Other systems can also be used in order to reduce the filling space such as, for instance, curtains sliding on shafts from the outside to the center of the reactor, adjustable panels positioned on the tube plate, inflatable elements or covers of cone shape with at least one adjustable diameter.

The tests carried out by the applicants have shown that the method and the device in accordance with the present invention have definite advantages over those of the prior art:

- on the one hand, a uniformity of filling of the different tubes, which is far greater than that resulting from the known methods, is obtained, since the average difference in loss of head measured on all the devices is not more than 1 to 3%;
- on the other hand, the filling time is considerably reduced since, in order to fill a reactor comprising more than 11,000 tubes of a diameter of 1 inch each (2.54 cm) and a length of 3 meters with, for instance, particles of a maximum size of 6 mm, less than 20 hours is required with the method in accordance with the invention as compared with more than 40 hours with the methods of the prior art.
- finally, the filling density is substantially increased, namely by about 2 to 8%, as compared with the prior art.

Another advantage of the present invention relates to the saving in time obtained for checking of the losses in head in the full tubes during the filling of the other tubes, which represents a saving in the time for which the reactor, and therefore the industrial unit, is shut down.

It will also be noted that, with use of the methods and apparatus of the invention, the number of interventions (required to compensate and correct for inadequately filled tubes) is reduced by substantially one half as compared with a filling employing the prior art techniques (for instance, with vibrations).

It is known that if the catalyst is fragile, the method and the device of the invention may at times lead to the formation of fines, as a result of the particles striking against the solid faces of the upper face of the tube plate of the reactor. The applicant has, however, found that it is possible substantially to eliminate such fragmentation of particles and the formation of fines resulting therefrom by providing the inner surface of the tube plate with a covering of a shock-absorbing material, preferably a material of the fabric, cardboard, elastomeric-plate or carpet type, in which orifices of identical diameter are provided aligned with the corresponding open ends of the tubes. Furthermore, a cover of carpet type has the advantage of acting as a trap for the dust, which is practically always present on the surface of the catalyst particles.

BRIEF DESCRIPTION OF THE DRAWINGS

In this specification and in the accompanying drawings, we have shown and described preferred embodiments of our invention and have suggested various alternatives and modifications thereof; but it is to be understood that these are not intended to be exhaustive and that many other changes and modifications can be made within the scope of the invention. The suggestions herein are selected and included for purposes of illustration in order that others skilled in the art will more fully understand the invention and the principles thereof and will thus be enabled to modify it in a variety of forms, each as may be best suited to the conditions of a particular use.

DETAILED DESCRIPTION OF THE INVENTION

Figure 1:
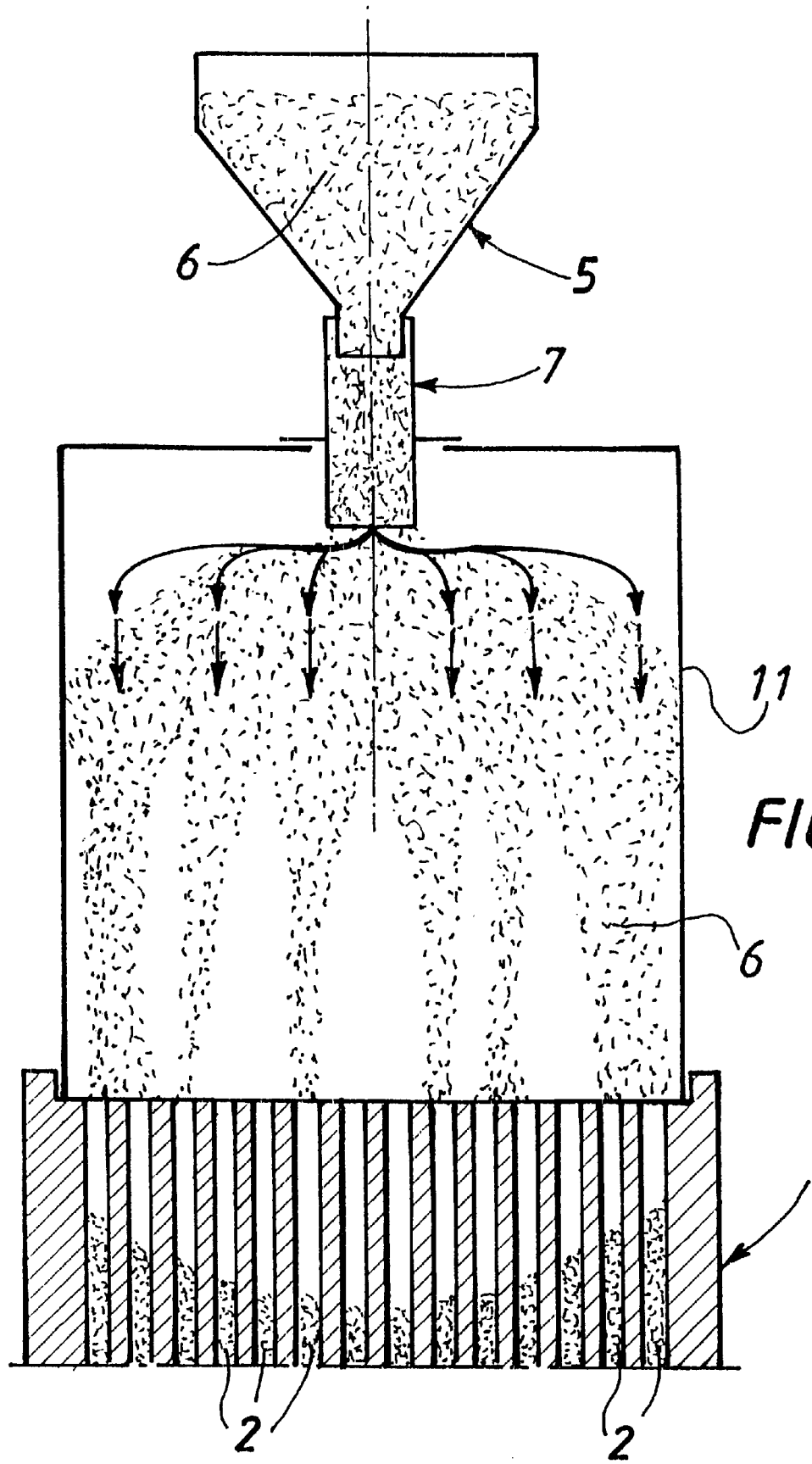
FIGS. 1 and 2 are two vertical sections through a tubular reactor provided with a filling device in accordance with the invention, shown in two successive phases of filling.
Figure 2:
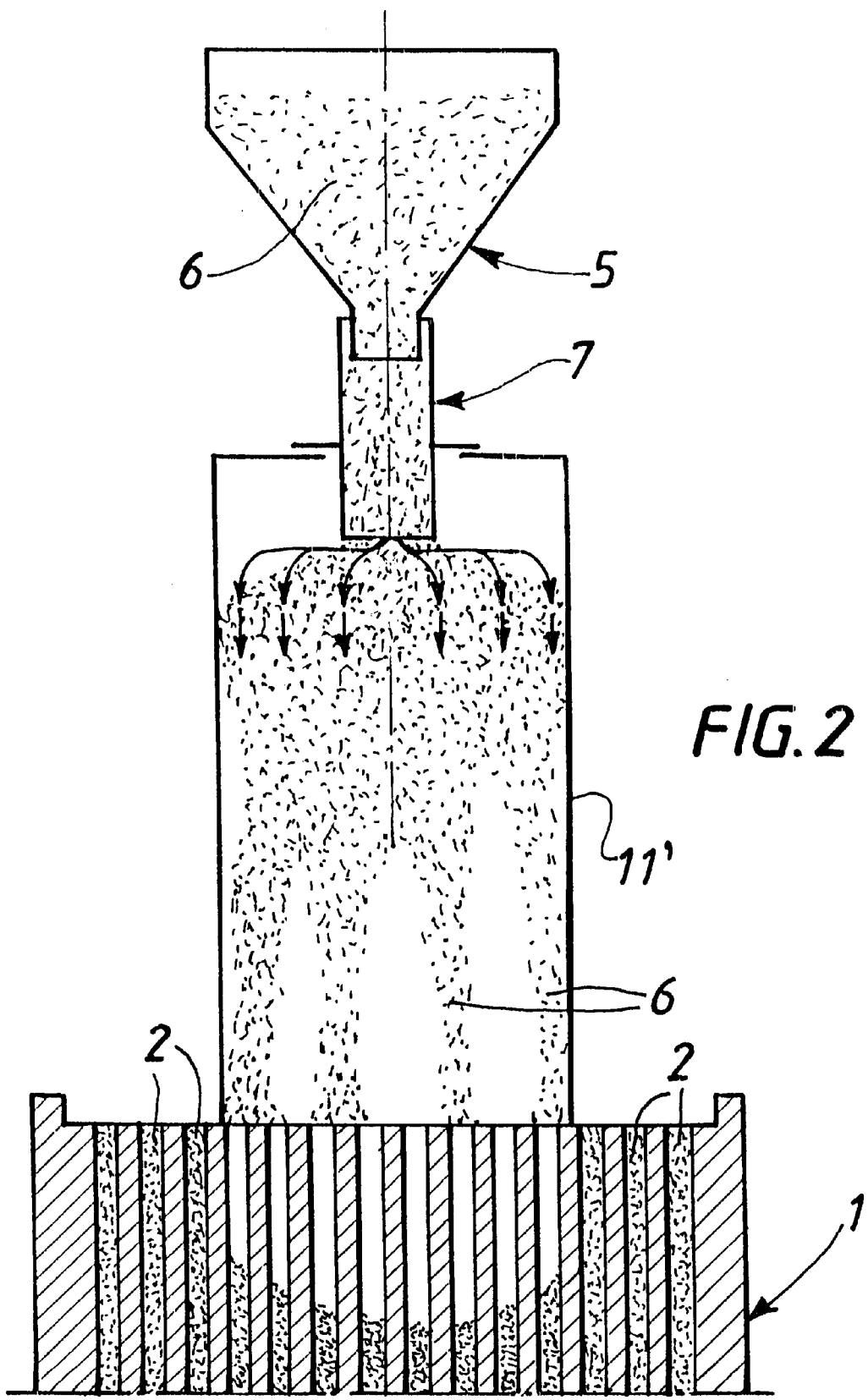
Figure 3:
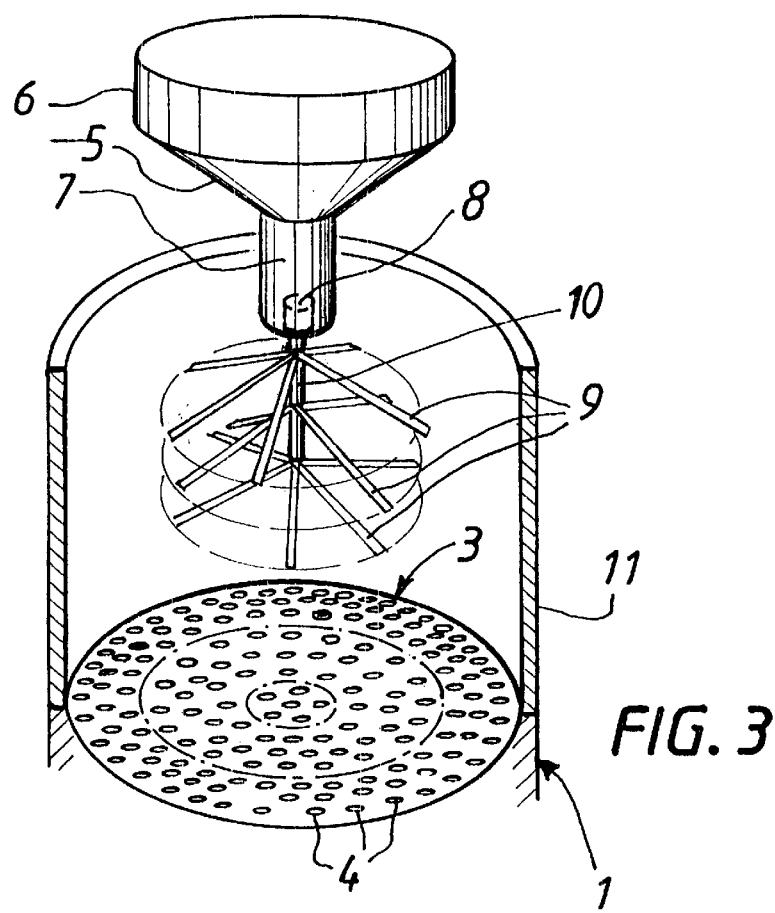
FIG. 3 is a basic view, in perspective, partially sectioned, illustrating one embodiment of a method of filling in accordance with the invention.

Referring first to FIGS. 1 to 3, these show a tubular reactor 1, comprising a plurality of contiguous vertical tubes 2 opening at their upper end through a tube plate 3 (see FIG. 3), provided with orifices 4, which tubes are preferably arranged substantially in cylindrical rings.

Above the reactor 1, there is arranged a filling device for distribution in the form of rain. This dense filling device is preferably of the type referred to above patented by the applicants' coworkers, comprising a hopper 5 feeding a reservoir 7 with particles of catalyst 6.

Below the reservoir 7, there is a mobile unit formed, see FIG. 3, of flexible thongs 9 arranged along three different levels. The thongs 9 are driven in rotation by a motor 8 driving a shaft 10, on which they are articulated so as to be able to rise under the effect of the centrifugal force. As described in the above-mentioned patents (e.g. U.S. Pat. No. 4,564,328), the catalyst particles 6, upon falling on the thongs 9, are deflected by them and then fall in the direction of the plate 3.

As has been explained above, the laterally deflected particles 6 have a tendency to fill the tubes 2 arranged on the periphery of the reactor more rapidly. In these tubes, a uniform dense filling is obtained but, when they are full, the particles, which accumulate on their top, flow down laterally into the contiguous tubes, in which an initially dense filling is followed by an ordinary filling. This results in a non-uniform filling for the different tubes of the reactor and it is this serious problem, which the invention proposes to solve.

For this purpose, as can be noted from FIG. 1, before the filling, there is installed on the upper plate 3 of the reactor, on its periphery, a vertical cylindrical wall 11, possibly closed at its top, with the mobile unit arranged in the upper portion of the reactor.

A first filling phase is then carried out, which is stopped when the tubes 2 arranged at the periphery of the reactor are full. The filling thus effected in these tubes is a uniform dense filling, as well as in the other tubes, which are only partly full.

The cylindrical wall 11 is then withdrawn and replace by a wall 11' (FIG. 2) of smaller diameter, the base of which separates the peripheral tubes, which are already full, from the other inner partially-filled tubes.

The filling is then resumed so as to fill the tubes 2 arranged in the vicinity of the inner portion of wall 11' and, when they are full, the filling is interrupted and the wall 11' is replaced by a new wall of smaller diameter, repeating the procedure as frequently as necessary in order for all the tubes to be filled (but without excessive over filling).

There is thus obtained, for all of the tubes, a dense filling of a density 2 to 8% greater than the filling obtained by the systems of the prior art, in which the tubes are filled one by one or by series of tubes. There is furthermore noted an excellent uniformity of the filling, with an average loss in head calculated on all of the tubes of not more than 3%.

In order to avoid the possible breaking up of particles of catalyst by striking against the said tube plate 3, the surface of said tube plate is advantageously covered with a lining of a material adapted to damp the impact of the particles, providing openings in said lining of substantially equivalent diameter to and aligned with the orifices of the tubes 2 of the reactor. A similar damping material may advantageously cover the inner surface of the cylindrical walls 11, at least at their lower part. This material may, for instance, be of the fabric, cardboard, elastomeric-plate or preferably carpet type, this carpet having the advantage of retaining the dust of the particles, which is practically always present on the surface of the particles of catalyst.

As has been indicated above, instead of using separate cylindrical walls 11, 11', etc. in the different filling phases, one may also have recourse to a single wall of adjustable diameter.

Figure 4:
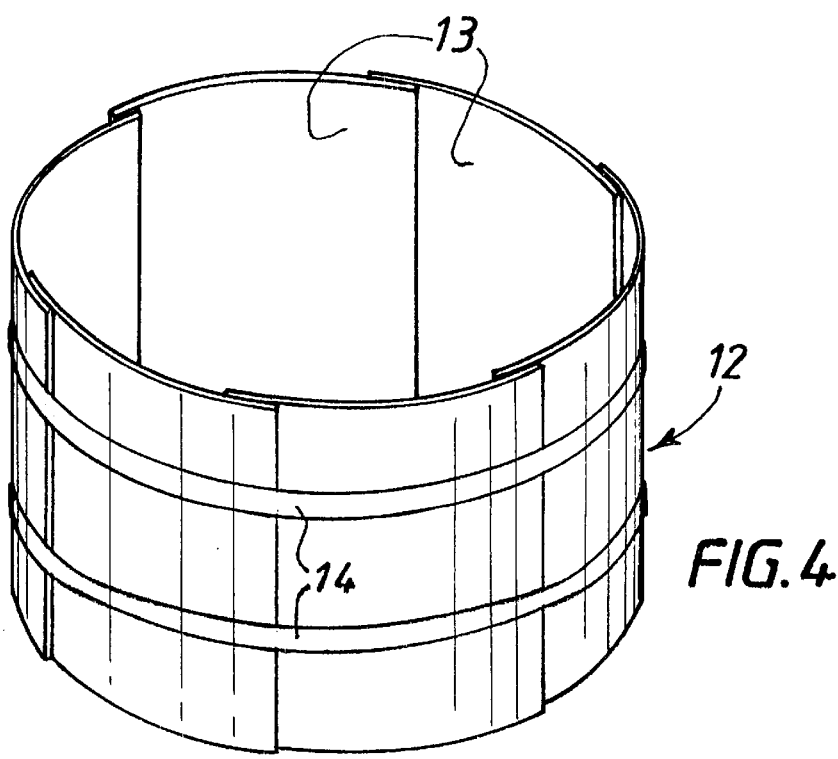
FIG. 4 is a perspective view of a cylindrical enclosure of adjustable diameter suitable for use in the present invention.

By way of example, such a wall 12 is shown in FIG. 4. It is formed of a plurality of concentric cylindrical sectors 13 overlapping each other laterally in adjustable manner and held in position by fastening systems 14, the length of which is also adjustable.

The invention therefore provides a simple means, easy to carry out, for effecting a rapid and uniform dense filling of the various tubes of a tubular reactor.

The comparative example described below also illustrates the advantages of the invention.

EXAMPLE

Two successive fillings are effected of the same chemical reactor consisting of 11,858 substantially vertical tubes, each of these tubes having a diameter of 24.8 mm and a length of 2900 mm, with a catalyst, the particles of which are of ball shape, the diameter of these particles varying from 3 to 6 mm.

The first filling is effected with the method and device of the invention, the mobile unit of this device being formed of flexible thongs, arranged in three different levels and driven by a drive means. This mobile unit is in accord with the device described in French Patent Application No. 95-12334 of Oct. 20, 1995.

The second filling is in accord with the prior art, that is to say a filling by series of tubes, with vibrating feed hopper.

The results obtained are set forth in the following Table 1.

TABLE 1

|  | FILLING 1 Method and Device in Accordance with the Invention | FILLING 2 Filling by Series of Tubes with Vibrating Feed Hopper |
|---|---|---|
| FILLING TIME (hours) | 14 | 48 |
| DENSITY OF FILLING ($g/cm^3$) | 0.867 | 0.826 |
| TUBES REQUIRING FURTHER FILLING AFTER MEASURING THE LOSS IN HEAD OF EACH TUBE | 0 | 45 |
| NUMBER OF INTERVENTIONS DURING THE FILLING | 6 | 10 |

It is seen that the filling effected with the method and device of the present invention is particularly advantageous as compared with a filling technique described in the prior art and, while reducing the filling time by about 70%, there is furthermore obtained an increase in density of filling of the reactor of about 5% and a perfect uniformity of the filling of the tubes, since none of them had to be emptied in order to proceed with a new filling. Furthermore, the number of interventions is reduced by substantially one half.

We claim:

1. A method for filling solid catalyst particles uniformly in a tubular reactor having a multiplicity of vertical tubes with filling orifices at their upper ends opening at the upper surface of a tube plate which plate connects the tubes and is substantially perpendicular to the tubes, by means of a filling system which generates a largely uniform rain of the particles over the entire surface of said plate containing such orifices for dense filing of the tubes with catalyst particles, the method comprising:

disposing around and above said tube plate a first cylindrical wall of a diameter sufficient such that all the filling orifices of the tubes are located within the cylindrical enclosure thus created, generating said uniform filling rain of particles within the cylindrical wall, interrupting said uniform filling rain when the tubes, arranged at the periphery of the tube plate and in the vicinity of the cylindrical wall, are full, disposing a second cylindrical wall of a diameter less than the first on the tube plate with the diameter of the second wall being such that the tubes, which are already full, are located to the outside said second wall, while the tubes, which are not completely filled, are located inside said second wall, resuming the uniform filling with the particles until the tubes located closest to the second cylindrical wall are in their turn full, and continuing such filling cycle, as needed, each time replacing the prior cylindrical wall used by a cylindrical wall of smaller diameter so as each time to separate the filling orifices of the outer filled tubes from those inner ones which are not full, until all tubes are filled.

2. A method according to claim 1, wherein the successively smaller cylindrical walls are formed by a single device having an adjustable diameter, which is reduced after each filling phase.

3. A method according to claim 1, wherein the rate of filling of the catalyst into the reactor is between 0.5 tons/hour and 4 tons/hour per $m^2$ of cross sectional area of the tubes being fed.

4. A method according to claim 1, wherein the uniform falling rain of catalyst particles is generated by dropping said particles onto deflector elements rotating around a vertical axis.

5. A method according to claim 3, wherein the uniform falling rain of catalyst particles is generated by dropping said particles onto deflector elements rotating around a vertical axis.

6. A method according to claim 1, comprising at least during filling of the tubes maintaining a resilient cover over the tube plate connecting the tubes together, but exclusive of the tube openings, for damping impacts of falling particles.

7. A method for filling solid catalyst particles uniformly in a tubular reactor, which has a bundle of closely spaced vertical tubes opening at their upper ends out onto the essentially flat upper surface of a tube plate, to which plate the tubes connected thereto are substantially perpendicular, by means of a filling system which generates a largely uniform rain of the particles capable of falling over the entire portion of the surface of said plate containing such orifices for dense filing of the tubes with catalyst particles, the method comprising:

disposing around and above said tube plate a containing wall of a shape to enclose the upper surface of the tube plate in such a manner that all the filling orifices of the tubes are located within the walled enclosure thus created, generating said uniform filling rain of particles within the walled enclosure, interrupting said uniform filling rain when the tubes, arranged at the periphery of the tube plate and in the vicinity of the containing wall, are full, disposing on the tube plate a walled enclosure having peripheral dimensions which are less than the original dimensions such that those tubes, which are now currently full, are located to the outside said wall of modified dimensions, while the tubes, which are not completely filled, are located inside such wall of modified dimensions, resuming the uniform filling with the particles until the tubes located closest to the wall of modified dimensions are in their turn full, and continuing such filling cycle, as needed, each time using a containing wall of modified peripheral dimensions so as each time to separate the filling orifices of the outer filled tubes from those inner ones which are not full, until all tubes are filled.

8. A method according to claim 7, wherein the successively smaller walled enclosures are cylindrical and are formed by a single device having an adjustable diameter, which is reduced after each filling phase.

9. A method according to claim 7, wherein the rate of filling of the catalyst into the reactor is between 0.5 tons/hour and 4 tons/hour per $m^2$ of cross sectional area of the tubes being fed.

10. A method according to claim 7, wherein the uniform falling rain of catalyst particles is generated by dropping said particles onto deflector elements rotating around a vertical axis.

11. A method according to claim 7, comprising at least during filling of the tubes maintaining a resilient cover over the tube plate connecting the tubes together, but exclusive of the tube openings, for damping impacts of falling particles.

12. A method according to claim 7, wherein said containing walls and walled enclosures are formed by inflatable elements of cone shape, with at least one adjustable diameter.

13. A method according to claim 7, wherein the successively smaller walled enclosures are cylindrical and are formed by a multiple number of separate devices.

14. A method for the homogeneous filling of particles of a solid catalyst in a tubular reactor, having a plurality of vertical tubes debouching at their upper ends in filling orifices at the surface of a tube plate, which connects them and is substantially perpendicular to them, by means of a filling system, which assures a uniform rain of the particles on the surface of said plate containing said orifices, this method comprising:

a first cylindrical wall of a diameter substantially identical to the tube plate being disposed around and above the tube plate in such a manner that all the filling orifices of the tubes are located within the cylindrical enclosure thus created, particles being uniformly fed within the cylindrical wall, said uniform filling being interrupted when the tubes arranged at the periphery of the tube plate and near the cylindrical wall are full, a second or modified cylindrical wall of a diameter less than the preceding one being disposed on the tube plate, the diameter of this second wall being such that the tubes, which have been already fully filled, are located to the outside of said wall, while the tubes, which are not completely filled, are located within said second wall, the uniform distribution of the particles being resumed until the tubes located closest to the cylindrical wall currently in place are in their turn full and continuing the filling cycle, as needed, each time replacing or modifying the cylindrical wall used by a cylindrical wall of smaller diameter so as to separate the filling orifices of the full tubes from those which are not full.

15. A method according to claim 14, wherein the successively smaller cylindrical walls are formed by a single device having an adjustable diameter, which is reduced after each filling phase.

16. A method according to claim 14, wherein the rate of filling of the catalyst into the reactor is between 0.5 tons/ hour and 4 tons/hour per m² of cross sectional area of the tubes being fed.

17. A method according to claim 16, wherein the uniform falling rain of catalyst particles is generated by dropping said particles onto deflector elements rotating around a vertical axis.

18. A method according to claim 14, wherein the uniform falling rain of catalyst particles is generated by dropping said particles onto deflector elements rotating around a vertical axis.

19. A method according to claim 14, comprising at least during filling of the tubes maintaining a resilient cover over the tube plate connecting the tubes together, but exclusive of the tube openings, for damping impacts of falling particles.

20. A method according to claim 14, wherein the successively smaller cylindrical walls are a multiple number of separate devices.

* * * * *